US006423241B1

(12) United States Patent
Yoon et al.

(10) Patent No.: US 6,423,241 B1
(45) Date of Patent: Jul. 23, 2002

(54) INK JET PRINT HEAD AND A METHOD OF PRODUCING THE SAME

(75) Inventors: Jun Bo Yoon; Jae Duk Lee; Chul Hi Han; Choong Ki Kim, all of Taejon; Doo Won Seo, Seoul, all of (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 09/209,560

(22) Filed: Dec. 11, 1998

(30) Foreign Application Priority Data

Jan. 22, 1998 (KR) ............................................ 98-1800

(51) Int. Cl.$^{7}$ ............................................... G11B 5/127

(52) U.S. Cl. ......................... 216/27; 205/665; 205/666; 205/667; 430/312; 430/322; 430/394

(58) Field of Search ........................... 216/27; 430/312, 430/322, 394; 205/665, 666, 667

(56) References Cited

U.S. PATENT DOCUMENTS 4,966,664 A * 10/1990 Buerk et al. ................ 204/146
5,211,806 A * 5/1993 Wong et al. ................ 156/644
5,550,090 A * 8/1996 Ristic et al. ................ 437/228
5,733,433 A * 3/1998 Lee et al. ................... 205/665
5,792,591 A * 8/1998 Theuwissen ................ 430/312

* cited by examiner

*Primary Examiner*—Randy Gulakowski
*Assistant Examiner*—M. Kornakov
(74) *Attorney, Agent, or Firm*—Birch, Stewart, Kolasch & Birch, LLP

(57) ABSTRACT

Disclosed is an ink jet print head and a method of producing the same, the ink jet print head including a plurality of ink ejecting orifices which are formed with a desired shape and a uniform size by only once using metal plating technique, having an excellent productivity and a low manufacturing cost. According to a first embodiment of the present invention, in the steps for forming an improved metal barrier layer, which is comprised of the conventional barrier layer and the conventional nozzle plate combined together, the metal barrier layer can be formed on a wetting layer by using electrolytic plating or electroless plating of Ni. As a result, an upper surface of a first photoresist mold is completely covered with the overflowing Ni. Further, an upper portion of a second photoresist mold is partially covered with the overplating Ni and is partially opened at a proper size and a desired shape. Thereby, an ink ejecting orifice is created at the upper portion of the second photoresist mold. Alternatively, according to a second embodiment of the present invention, by forming a third photoresist mold at a predetermined position in which the ink ejecting orifice will be formed, the overflowing Ni is formed around the third photoresist mold, and thereby the ink ejecting orifice is created. The ink ejecting orifice has a desired shape, a uniform size and a high sectional height, which are adapted to provide an optimum ejection of the ink.

8 Claims, 12 Drawing Sheets

INK JET PRINT HEAD AND A METHOD OF PRODUCING THE SAME

BACKGROUND OF THE INVENTION

1. Field of the Invention

The present invention relates to an ink jet print head including a plurality of ink ejecting orifices which are formed at a desired shape and a uniform size by only once using a plating technique of a metal, having an excellent productivity and a low manufacturing cost. The invention also relates to a method of producing the ink jet print head.

2. Description of the Related Art

Generally, in operation, an ink jet printer makes a light noise and shows an excellent resolution. In addition, the ink jet printer can provide a colorful printed matter at a low cost. Accordingly, the ink jet printer is relatively well developed and broadly sold as compared with a dot matrix printer or a laser printer in the field of a personal computer market. Also, a manufacturing technique of a print head that is an important component of the ink jet printer makes rapid progress in the last ten years due to the development of a semiconductor manufacturing technique. As a result, a print head having about 300 nozzles for ejecting ink and capable of providing 600 dpi resolution can be produced as it is mounted to a disposable ink cartridge.

This assignee of the present invention and the others disclose the art of a thermal ink jet print head construction in the bulletin issued by the IEEE International Electron Device Meeting, p601, 1995, the disclosure of which is herein incorporated by reference. FIGS. 15 and 16 show this thermal ink jet print head. That is, FIG. 15 is a sectional view of the thermal ink jet print head, and FIG. 16 is a perspective view of the ink jet print head shown in FIG. 15, showing the positions and the shapes of an ink channel, an ink cavity and an ink ejecting orifice. Hereinbelow, a structure and an operating principle of the ink jet print head according to the prior art will be briefly explained with reference to the above document and FIGS. 15 & 16.

Typically, ink approaches toward a front surface of a substrate 101 of an ink jet print head 100 through a first ink channel 102 from a rear surface of substrate 101 of ink jet print head 100. The ink supplied through first ink channel 102 flows along a second ink channel 103 defined by a barrier layer 108 and a nozzle plate 109, and then enters into an ink cavity 104. The ink temporarily contained in ink cavity 104 is instantaneously heated by heat generated from a resistance element 106 disposed below a protective layer 105. At this time, a part of the ink contained in ink cavity 104 is forcibly ejected out of inkjet print head 100 through an ink ejecting orifice 107, which is formed at a predetermined position above ink cavity 104, by air bubbles generated in the ink due to the heat.

In ink jet print head 100 as described above, barrier layer 108 and nozzle plate 109 are important factors capable of determining the whole flowing characteristic of the ink fluid. That is, barrier layer 108 and nozzle plate 109 have an effect upon a flow of the ink, an ejecting shape of the ink, a satellite characteristic and an ink ejecting frequency characteristic, etc. Therefore, a variety of researches in relation to the quality, the shape and the manufacturing methods of barrier layer 108 and nozzle plate 109 have been performed.

The present time, the manufacturing methods of the ink jet print head in relation to the barrier layer and the nozzle plate can be classified into a method for manufacturing a hybrid ink jet print head and a method for manufacturing a monolithic ink jet print head. According to the method for manufacturing the hybrid ink jet print head, a substrate and a nozzle plate are separately produced and thereafter they are combined together using a certain adhesive agent. In other words, the nozzle plate is separately produced and thereafter it is aligned on the substrate on which a barrier layer made of polymer is laid. Under this state, the nozzle plate is attached to the substrate using the adhesive agent. Alternatively, the nozzle plate and the barrier layer are produced as one body, and thereafter they are aligned on the substrate. Under this state, they are attached to the substrate by using the adhesive agent. According to the method for manufacturing the monolithic ink jet print head, the barrier layer and the nozzle plate directly grow up on the substrate.

The methods for manufacturing the hybrid ink jet print head are disclosed in U.S. Pat. No. 4,694,308, issued to C. S. Chan et al. on Sep. 15, 1987, and disclosed in the bulletin issued by the IEEE Solid-State Sensor and Actuator Workshop, pp200~204, 1996, of Christopher C. Betty entitled “A chronology of thermal ink-jet structures”, the disclosures of which are herein incorporated by reference.

The methods for manufacturing the monolithic ink jet print head are disclosed in U.S. Pat. No. 4,438,191, issued to Frank L. Cloutier et al. on Mar. 20, 1984, and disclosed in the bulletin issued by the IEEE International Electron Device Meeting, p601, 1995, of this assignee of the present invention et al. entitled “A monolithic thermal ink-jet print head utilizing electrochemical etching and two-step electroplating techniques”, the disclosures of which are herein incorporated by reference.

With reference to the above documents, a primary advantage of the method for manufacturing the monolithic ink jet print head over the method for manufacturing the hybrid ink jet print head, is that it is unnecessary to have a mandrel made of stainless steel required to plate the nozzle plate. As a result, there are no subordinate steps required to separate the mandrel from the nozzle plate. Further, it is unnecessary to provide any adhesive agent consumed to attach the nozzle plate to the substrate. Thereby, there are no working steps and equipments for combining the nozzle plate and the substrate with each other using the adhesive agent. In addition, it is possible to elaborately align the substrate, the barrier layer and the nozzle plate with one another. Therefore, it is possible to reduce the manufacturing steps of the ink jet print head. Thereby, the manufacturing cost thereof is reduced and the productivity is enhanced. In addition, the method for manufacturing the monolithic ink jet print head is adapted to manufacture an ink jet print head for a high resolution, which necessitates an elaborate alignment.

FIGS. 17A to 17C illustrate schematically a sequence of manufacturing steps of a monolithic ink jet print head according to a prior art Hereinbelow, the sequence of manufacturing steps of the monolithic ink jet print head will be briefly explained with reference to FIGS. 17A to 17C.

A first seed metal layer 301 for plating a metal barrier layer is deposited on a substrate 101 in which a resistance element 106 and a protective layer 105 are formed. In the formation of first seed metal layer 301, an upper surface of protective layer 105 is plated with titanium at a thickness of about 200 Å to provide good adhesion. And thereafter, gold is deposited thereon at a thickness of about 2,000 Å. Following formation of first seed metal layer 301, first photoresist molds 302,303 are formed on first seed metal layer 301 by using photolithography technique. In a subsequent process step, first photoresist molds 302,303 are etched with HF to provide an ink channel and an ink cavity. At this time, the height of first photoresist molds 302,303 is about 30~40 $\mu$m. This height is the same as that of the ink channel and the ink cavity.

Following formation of first photoresist molds 302,303 on first seed metal layer 301, a metal barrier layer 108 is deposited on first seed metal layer 301 by plating of Ni up to the height of first photoresist molds 302,303. Thereafter, a second seed metal layer 304 for a secondary plating of a metal is deposited on metal barrier layer 108 and first photoresist molds 302,303 in accordance with the same forming method as that of first seed metal layer 301.

Following formation of metal nozzle plate 109, second photoresist mold 305, second wetting layer 304, first photoresist molds 302, 303 and first wetting layer 301, which are located in barrier layer 108 and nozzle plate 109, are etched with HF in sequence. Consequently, an ink ejecting orifice 107, an ink cavity 104 and a second ink channel 103 are formed and thereby a passage allowing the ink to flow is created. Thereafter, in order to prevent barrier layer 108 and nozzle plate 109 from being corroded by the ink following along the passage, anti-corrosion plating is performed. As a result, barrier layer 108 and nozzle plate 109 are completely produced. Finally, a first ink channel 102 is formed in substrate 101 using electrolyte polishing, and thereby a print head 100 having a complete structure is manufactured.

Following formation of metal nozzle plate 109, second photoresist mold 305, second seed metal layer 304, first photoresist molds 302,303 and first seed metal layer 301, which are located in barrier layer 108 and nozzle plate 109, are etched with HF in sequence. Consequently, an ink ejecting orifice 107, an ink cavity 104 and a second ink channel 105 are formed and thereby a passage allowing the ink to flow is created. Thereafter, in order to prevent barrier layer 108 and nozzle plate 109 from being corroded by the ink flowing along the passage, anti-corrosion plating is performed. As a result, barrier layer 108 and nozzle plate 109 are completely produced. Finally, a first ink channel 102 is formed in substrate 101 using the electrolytic polishing, and thereby a print head 100 having a complete structure is manufactured.

However, the process for forming the barrier layer and the nozzle plate as described above is complicated. Accordingly, the confidence of work and the productivity deteriorate. In addition, there are several disadvantages in the process. That is, due to the heat generated during performing the vacuum depositing process for forming second seed metal layer 304 or performing the process for forming second photoresist mold 305, the shapes of first photoresist molds 302,303 can be changed and thereby second seed metal layer 304 can be cut. Further, when metal barrier layer 108 consisted of Ni is deposited up to the height of first photoresist molds 302,303, it is difficult to align the height of metal barrier layer 108 with that first photoresist molds 302,303 on a substrate having a wide area.

SUMMARY OF THE INVENTION

The present invention is contrived to solve the foregoing problems. It is a first object of the present invention to provide a method of producing an ink jet print head including a plurality of ink ejecting orifices which are formed at a desired shape and a uniform size by only once using a plating technique of a metal, having an excellent productivity and a low manufacturing cost.

In order to achieve the above first object, the present invention provides a method of producing an ink jet print head, comprising the steps of:

(a) preparing a substrate including a resistance element for heating ink therein and including a seed metal layer deposited an upper surface thereof;

(b) forming a photoresist mold on the seed metal layer;

(c) forming a metal barrier layer on one part of the seed metal layer and the photoresist mold;

(d) etching the one part of the seed metal layer and the photoresist mold in order to form an ink flowing passage within the metal barrier layer; and (e) etching the other part of the substrate in order to form a main ink channel which is fluid-communicated with the ink flowing passage.

Preferably, the method further comprises the step of (f) anti-corrosion plating an inner surface of the ink flowing passage in order to prevent the metal barrier layer from being corroded by the ink flowing along the ink flowing passage.

The ink flowing passage includes an auxiliary ink channel, an ink cavity and an ink ejecting orifice, which are fluid-communicated with one another.

Preferably, the photoresist mold includes a first photoresist mold corresponding to the auxiliary ink channel and a second photoresist mold corresponding to the ink cavity.

Preferably, the photoresist mold includes a first photoresist mold corresponding to the auxiliary ink channel, a second photoresist mold corresponding to the ink cavity, and a third photoresist mold corresponding to the ink ejecting orifice.

Preferably, the step of (b) forming the photoresist mold, comprising the steps of:

(g) coating a photoresist on the substrate prepared in the step of (a) preparing the substrate;

(h) heat-treating the substrate on which the photoresist is coated;

(i) firstly irradiating the heat-treated substrate with the ultraviolet rays by using a first photo mask on which patterns corresponding to an ink channel and an ink cavity are formed;

(j) secondly irradiating the firstly irradiated substrate with the ultraviolet rays by using a second photo mask on which a pattern corresponding to an ink ejecting orifice is formed; and (k) forming a photoresist mold having a three-dimensional structure by developing the secondly irradiated substrate at a stroke.

Alternatively, the step of (b) forming the photoresist mold, comprising the steps of:

(g) coating a photoresist on the substrate prepared in the step of (a) preparing the substrate;

(h) heat-treating the substrate on which the photoresist is coated;

(i) firstly irradiating the heat-treated substrate with the ultraviolet rays by using a first photo mask on which a pattern corresponding to an ink ejecting orifice is formed;

(j) secondly irradiating the firstly irradiated substrate with the ultraviolet rays by using a second photo mask on which patterns corresponding to an ink channel and an ink cavity are formed; and (k) forming a photoresist mold having a three-dimensional structure by developing the secondly irradiated substrate at a stroke.

Further, it is a second object of the present invention to provide an ink jet print head including a plurality of ink ejecting orifices which are distributed on a wide wafer and has a desired shape, a uniform size and a high sectional height, which are adapted to an optimum ejection of the ink.

In order to achieve the above second object, the present invention provides an ink jet print head comprising:

a substrate having a resistance element for heating ink therein, a seed metal layer deposited on an upper surface thereof, and a main ink supplying passage allowing the ink supplied from an ink source to flow therethrough; and a metal barrier layer having an ink ejecting orifice for ejecting the ink contained in an ink cavity out of the ink jet print head, the metal barrier layer upwardly extending from the seed metal layer, the metal barrier layer refining an auxiliary ink channel and the ink cavity with the aid of an upper surface of the substrate in order to flow the ink being introduced through the main ink supplying passage.

The ink ejecting orifice has a circular shape, a triangular shape or a quadrangular shape.

As described above, according to the present invention, in the manufacturing process of the ink jet print head, by only once using the patterning process of the photoresist mold or the patterning process of the photoresist mold having the three-dimensional structure and by only once using the plating technique of the metal, the ink channel, the ink cavity and the ink ejecting orifice capable of allowing the ink to flow can be formed. Further, when the patterning process of the photoresist mold having the three-dimensional structure is used in order to manufacture the ink jet print head, the metal plating is converged around the photoresist mold protruding as the shape of the ink ejecting orifice. As a result, the plurality of ink ejecting orifices formed on the wide wafer have the uniform size, the desired shape and the high sectional height which are adapted to the optimum ejection of the ink.

BRIEF DESCRIPTION OF THE DRAWINGS

The above object and other characteristics and advantages of the present invention will become more apparent by describing in detail preferred embodiments thereof with reference to the attached drawings, in which.

DETAILED DESCRIPTION OF THE INVENTION

Hereinafter, preferred embodiments of the present invention will be explained in more detail with reference to the accompanying drawings.

FIGS. 1A to 3 illustrate schematically a sequence of manufacturing steps of an ink jet print head according to a preferred first embodiment of the present invention.

Figure 1A:
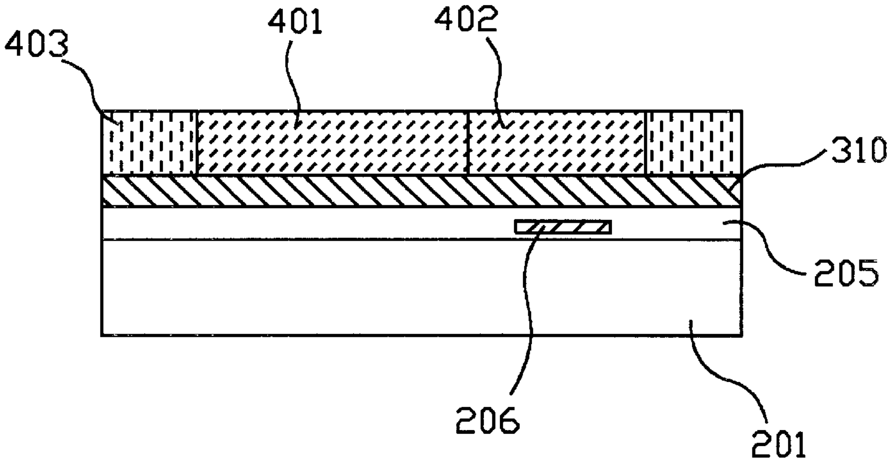
FIGS. 1A to 3 illustrate schematically a sequence of manufacturing steps of an ink jet print head according to a preferred first embodiment of the present invention.
Figure 1B:
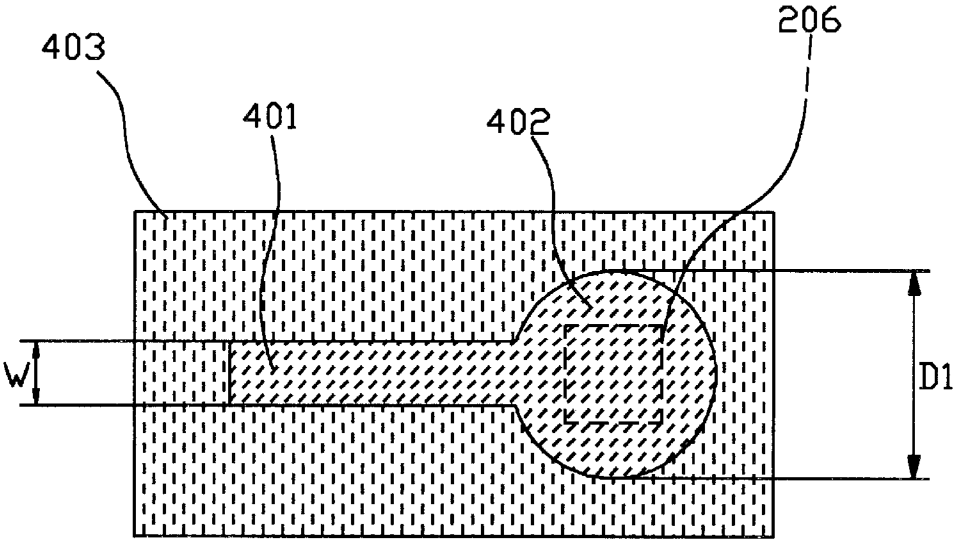

Referring to FIGS. 1A and 1B, a seed metal layer 310 for plating a metal barrier layer is deposited on an upper surface of a substrate 201 in which a resistance element 206 for heating ink and a protective layer 205 are formed. In the formation of seed metal layer 310, protective layer 205 is coated with a metal such as titanium, nickel or chromium at much greater thickness than 200 Å to provide good adhesion. And thereafter, gold is deposited thereon at much greater thickness than 2,000 Å. Following formation of seed metal layer 310, seed metal layer 310 is coated with photoresist or polyimid of approximately 30~40 $\mu$m in height by using the conventional spin-on technique or film-on technique, and thereby a first photoresist mold 401 and a second photoresist mold 402, which are layers of sacrifice, are formed on seed metal layer 310. That is, first photoresist mold 401 and second photoresist mold 402 are deposited on seed metal layer 310 by using the conventional photolithography technique. In a subsequent process step, first photoresist mold 401 and second photoresist mold 402 are etched with organic solvents like acetone to provide an ink channel and an ink cavity, respectively. At this time, first photoresist mold 401 and second photoresist mold 402 have the same height as that of the ink channel and the ink cavity.

Following formation of first photoresist mold 401 and second photoresist mold 402 on seed metal layer 310, a preliminary metal barrier layer 403 is deposited on a part of seed metal layer 310 by electrolytic plating or electroless plating of Ni, in close proximity to first photoresist mold 401 and second photoresist mold 402. Preferably, preliminary metal barrier layer 403 is formed on seed metal layer 310 by plating Ni up to the height of first photoresist mold 401 and second photoresist mold 402. FIG. 1B is a plan view of an ink jet print head, showing a preliminary metal barrier layer. For explaining the steps of manufacturing the ink jet print head, FIGS. 1A and 1B show the state that preliminary metal barrier layer 403 is plated up to the height of first photoresist mold 401 and second photoresist mold 402.

Figure 2A:
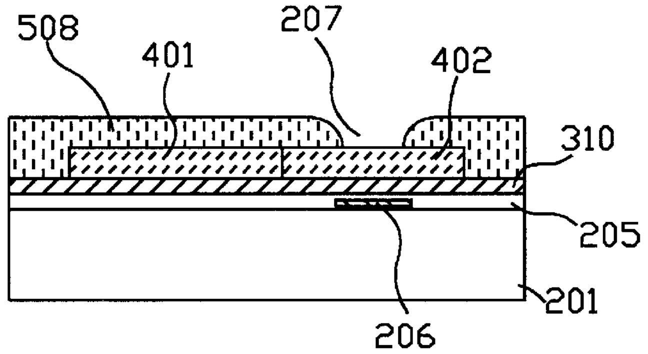
Figure 2B:
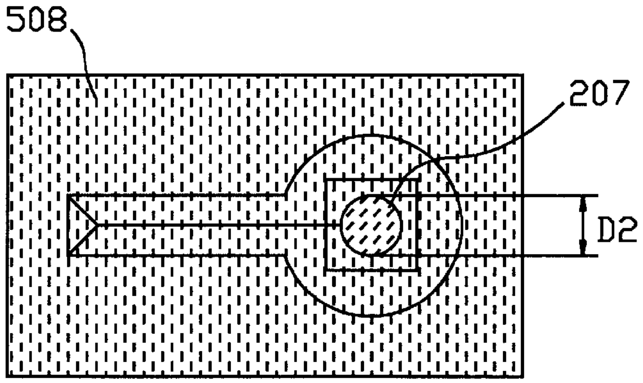
Figure 3:
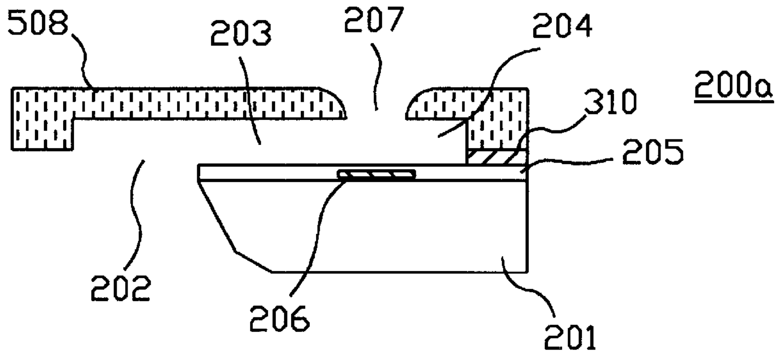

Referring to FIGS. 2A and 2B, a primary metal barrier layer 508 is formed by further plating Ni. That is, primary metal barrier layer 508 can be formed by continuously growing preliminary metal barrier layer 403 on seed metal layer 310. Substantially, primary metal barrier layer 508 is identical with preliminary metal barrier layer 403. An upper surface of first photoresist mold 401 providing the ink channel is completely covered with the overplating Ni plating layer. Consequently, the upper surface of first photoresist mold 401 can form a ceiling of the ink channel. Thereby, it is possible to only flow the ink toward the ink cavity. An upper portion of second photoresist mold 402 providing the ink cavity is partially covered with the overplating Ni plating layer and is partially opened at a proper size and a desired shape. Thereby, the upper portion of second photoresist mold 402 can provide an ink ejecting orifice 207.

However, in order to form ink ejecting orifice 207 properly using the overplating Ni plating layer, it is required to well design the size and the shape of second photoresist mold 402 providing the ink cavity. That is, the upper surface of first photoresist mold 401 must be completely covered with the overplating Ni plating layer as much as an upper surface of second photoresist mold 402 is covered with the overplating Ni plating layer.

In order to accomplish this task, a diameter (D1) of second photoresist mold 402 corresponding to the ink cavity, a diameter (D2) of ink ejecting orifice 207 and a width (W) of first photoresist mold 401 corresponding to the ink channel are determined by means of the following equation:

$$(D1-D2)>W \qquad (I)$$

Preferably, the diameter (D1) of second photoresist mold 402 corresponding to the ink cavity is set to 80 μm and the width (W) of first photoresist mold 401 corresponding to the ink channel is set to 30 μm. Further, the diameter (D2) of ink ejecting orifice 207 is set to 50 μm.

As a result, preliminary metal barrier layer 403, which is the Ni plating layer, continuously grows and overflows at both upper sides of first photoresist mold 401 at a flow rate of 20 μm. Consequently, the width (W) of first photoresist mold 401 is completely covered with Ni plating layer 403, and thereby the ceiling of first photoresist mold 401 is formed. Further, when Ni plating layer 403 overflows in the longitudinal direction of first photoresist mold 401 at a flow rate of 20 μm, and then it overflows in the vertical direction of first photoresist mold 401 at a flow rate of 30 μm. As a result, a sectional height of ink ejecting orifice 207 reaches about 30 μm. FIG. 2B is a plan view of an ink jet print head, showing the primary metal barrier layer.

Following formation of primary metal barrier layer 508, second photoresist mold 402, first photoresist mold 401 and seed metal layer 310, which are positioned beside primary metal barrier layer 508, are etched with proper chemical etchants in sequence. Consequently, a second ink channel 203, an ink cavity 204 and an ink ejecting orifice 207 are formed, and thereby a passage allowing the ink to flow is created. At this time, second ink channel 203, ink cavity 204 and ink ejecting orifice 207 are fluid-communicated with one another. After formation of the passage, in order to prevent primary metal barrier layer 508 from being corroded by the ink flowing along the passage, anti-corrosion plating is performed to an inner surface of the passage at a thickness of 1 μm. As a result, primary metal barrier layer 508 is completely produced. Finally, a first ink channel 202 is formed in substrate 201 using the electrolytic polishing. That is, a part of substrate 201 is etched in order to form first ink channel 202 which is fluid-communicated with the passage, and thereby a print head 200*a* of a complete structure is manufactured.

Figure 4:
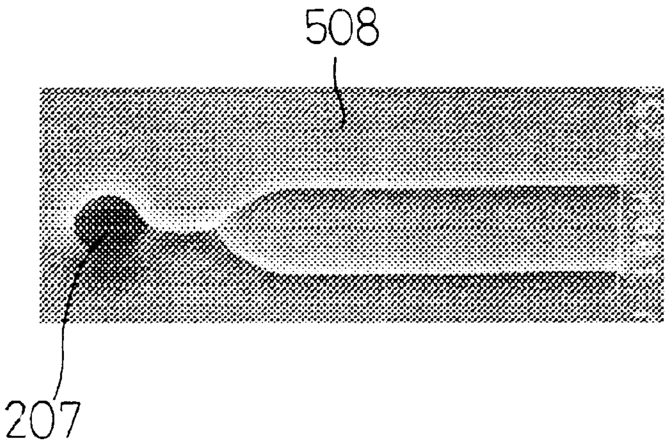
FIG. 4 is a scanning electron photomicrograph looked down on the ink jet print head according to the preferred first embodiment of the present invention.

FIG. 4 is a scanning electron photomicrograph looked down on the ink jet print head according to the preferred first embodiment of the present invention. As is apparent from FIG. 4, the Ni plating layer overflows the upper surface of the photoresist mold above the ink channel and thereby completely covers the ink channel.

Figure 5:
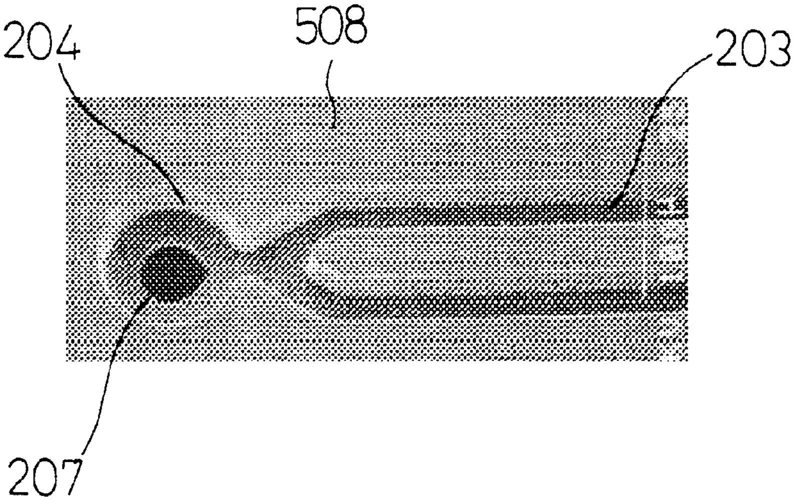
FIG. 5 is a scanning electron photomicrograph looked up the ink jet print head according to the preferred first embodiment of the present invention, under the state that a substrate of the ink jet print head is removed.

FIG. 5 is a scanning electron photomicrograph looked up the ink jet print head according to the preferred first embodiment of the present invention, under the state that a substrate of the ink jet print head is removed. As is apparent from FIG. 5, second ink channel 203, ink cavity 204 and ink ejecting orifice 207 are completely formed. Since the Ni plating layer overflows over second photoresist mold 402 above ink cavity 204, ink ejecting orifice 207 has a chestnut shape.

As described above, according to the preferred first embodiment of the present invention, in the manufacturing process of the ink jet print head, the photoresist mold and the metal plating layer are formed at a stroke, and thereby primary metal barrier layer 508, which is equal to a body consisted of the conventional barrier layer and the conventional nozzle plate combined together, can be formed. In primary metal barrier layer 508, second ink channel 203, ink cavity 204 and ink ejecting orifice 207 are simultaneously formed.

FIGS. 6A to 8 illustrate schematically a sequence of manufacturing steps of an ink jet print head according to a preferred second embodiment of the present invention. In the second embodiment of the present invention, a photoresist mold having a shape of the ink ejecting orifice is formed as a three-dimensional structure. At this time, the photoresist mold is formed at a position corresponding to the ink ejecting orifice above the ink cavity. As a result, the overflowing Ni plating layer is converged around the photoresist mold of the ink ejecting orifice.

Hereinbelow, the manufacturing process of the ink jet print head according to the preferred second embodiment of the present invention will be briefly explained with reference to FIGS. 6A to 8.

Figure 6A:
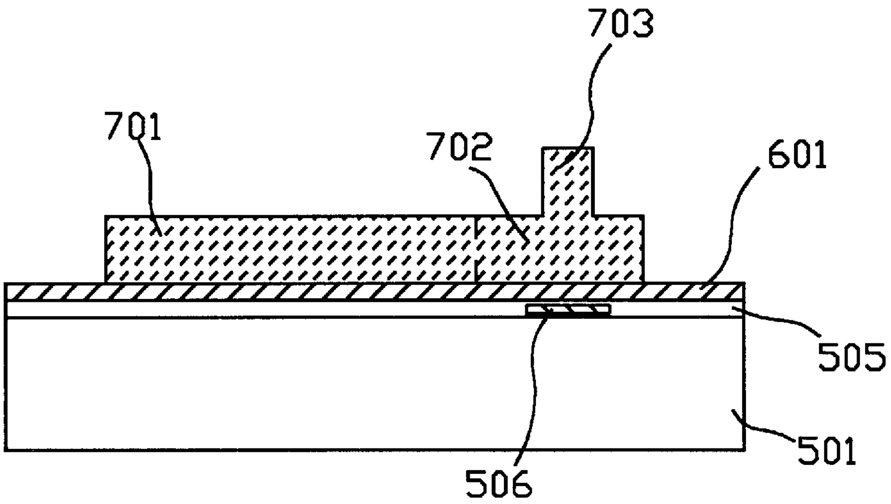
FIGS. 6A to 8 illustrate schematically a sequence of manufacturing steps of an ink jet print head according to a preferred second embodiment of the present invention.

Referring to FIG. 6A, a seed metal layer 601 for plating a metal barrier layer is deposited on a substrate 501 in which a resistance element 506 and a protective layer 505 are formed. In the formation of seed metal layer 601, protective layer 505 is coated with a metal such as titanium, nickel or chromium at much greater thickness than 200 Å under vacuum to provide good adhesion. And thereafter, gold is deposited thereon at much greater thickness than 2,000 Å. Following formation of seed metal layer 601, a first photoresist mold 701, a second photoresist mold 702 and a third photoresist mold 703, which are layers of sacrifice, are formed on seed metal layer 601 by using a sequence of patterning steps of a photoresist having a three-dimensional structure (The sequence of patterning steps according to the present invention will be explained hereinbelow). In a subsequent process step, first photoresist mold 701, second photoresist mold 702 and third photoresist mold 703 are etched with organic solvents like acetone to provide an ink channel, an ink cavity and an ink ejecting orifice.

Figure 6B:
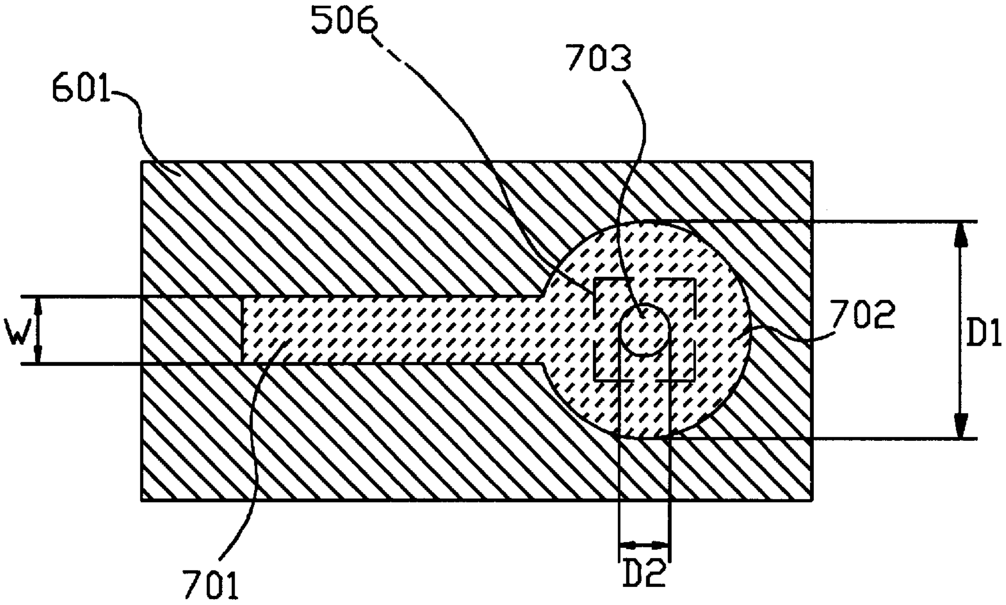

FIG. 6B is a plan view showing the state that a photoresist mold is formed on the seed metal layer. As seen in FIG. 6B, the height of first photoresist mold 701 and second photoresist mold 702 providing the ink channel and the ink cavity, respectively, is about 30~40 μm, and the thickness of third photoresist mold 703 is about 10 to 30 μm.

Figure 7A:
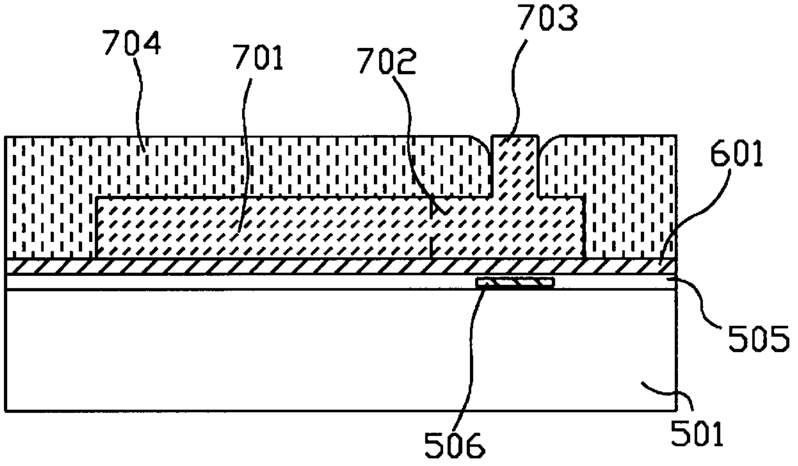

Following formation of first photoresist mold 701, second photoresist mold 702 and third photoresist mold 703 on seed metal layer 601, a metal barrier layer 704 is deposited on seed metal layer 601 by electrolytic plating or electroless plating of Ni, in close proximity to first photoresist mold 701, second photoresist mold 702 and third photoresist mold 703, as shown in FIG. 7A. Preferably, metal barrier layer

Figure 7B:
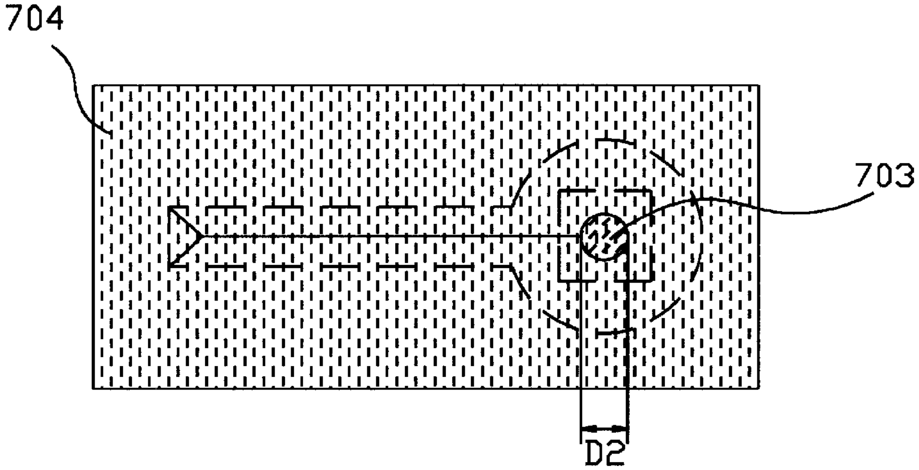

704 is formed on seed metal layer 601 by plating Ni over first photoresist mold 701 and second photoresist mold 702. Thereby, an upper surface of first photoresist mold 701 is completely covered with overplating Ni plating layer and can form a ceiling of the ink channel. Further, in a position above second photoresist mold 702, the overplating Ni plating layer is converged around third photoresist mold 703 which protrudes upward in order to correspond to the ink ejecting orifice having a predetermined size and a certain shape. FIG. 7B is a plan view showing the state that the metal barrier layer is formed on the photoresist mold.

At this time, contrary to the first embodiment of the present invention as described above, third photoresist mold 703 corresponding to the ink ejecting orifice blocks overflowing of the Ni plating layer during the continuous plating of the Ni. Accordingly, it is unnecessary to satisfy the equation (I) as described above in the determination of the diameter (D1) of second photoresist mold 702 corresponding to the ink cavity, the diameter (D2) of third photoresist mold 703 corresponding to ink ejecting orifice and the width (W) of first photoresist mold 701 corresponding to the ink channel. In the preferred second embodiment of the present invention, the values of the diameter (D1,D2) and the width (W) are identical with those of the preferred first embodiment of the present invention.

If a height of the final Ni plating layer, that is the height of metal barrier layer 704 is not greater than that of third photoresist mold 703 corresponding to the ink ejecting orifice, the size and the shape of the ink ejecting orifice do not change during keeping up the plating of Ni. At this time, a sectional height of the ink ejecting orifice is growing up.

Figure 8:
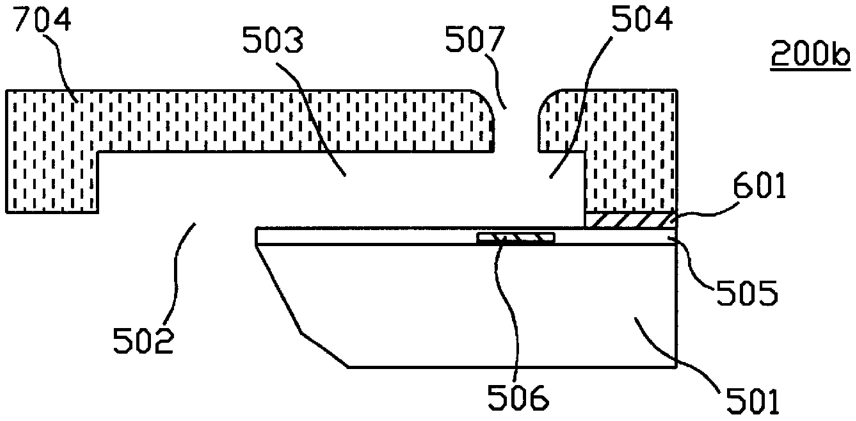

Referring to FIG. 8, following formation of metal barrier layer 704, third photoresist mold 703, second photoresist mold 702, first photoresist mold 701 and seed metal layer 601, which are positioned beside metal barrier layer 704, are etched with proper chemical etchants in sequence. Consequently, an ink ejecting orifice 507, an ink cavity 504 and a second ink channel 503 are formed and thereby a passage allowing ink to flow is created. Thereafter, in order to prevent metal barrier layer 704 from being corroded by ink flowing along the passage, anti-corrosion plating is performed to metal barrier layer 704. As a result, metal barrier layer 704 is produced. Finally, first ink channel 502 is formed in substrate 501 using the electrolytic polishing, and thereby a print head 200*b* having a complete structure is manufactured.

Figure 9A:
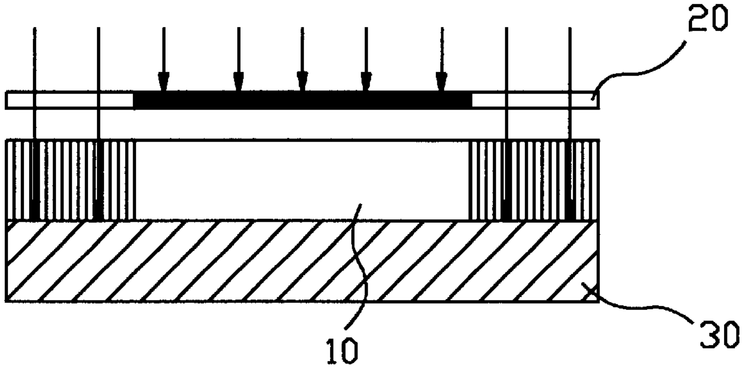
FIGS. 9A to 9C illustrate schematically a sequence of patterning steps of a photoresist having a three-dimensional structure.
Figure 9B:
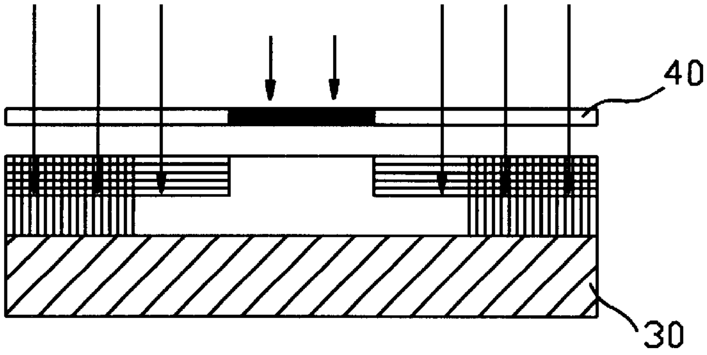
Figure 9C:
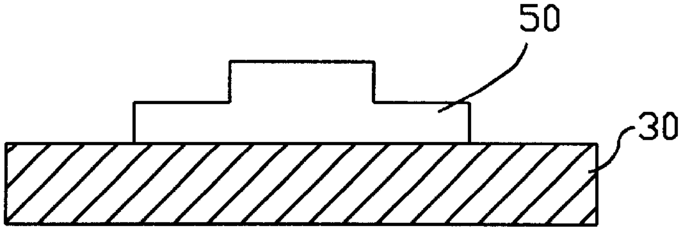

FIGS. 9A to 9C illustrate schematically a sequence of patterning steps of a photoresist having a three-dimensional structure. In the present invention, a photoresist having the third-dimensional structure is patterned by using a transformed patterning process corresponding to a conventional patterning process of the thick photoresist.

Referring now to FIG. 9A, a substrate 30 is coated with a photoresist 10 and is heat-treated. Thereafter, a first photo mask 20 is aligned with a pattern on substrate 30. In this state, photoresist 10 is irradiated with ultraviolet rays for a sufficient duration of exposure to penetrate up to a bottom of photoresist 10. Thereafter, as illustrated in FIG. 9B, a second photo mask 40 is aligned with the pattern on substrate 30. In this state, substrate 30 is irradiated with ultraviolet rays for a sufficient duration of exposure to penetrate up to a predetermined level of photoresist 10. This can be easily performed by controlling an exposure time of an ultraviolet exposure instrument. Further, by using the fact that a color of the thick photoresist changes after exposing substrate 30 to the ultraviolet rays, it is possible to align the pattern of second photo mask 20, which is already inscribed in photoresist 10, without necessarily aligning the pattern of second photo mask 40 with the pattern on substrate 30.

Meanwhile, instead of irradiating substrate 30 with the ultraviolet rays enough the percentage of exposure to penetrate up to the predetermined level of photoresist 10 after irradiating substrate 30 with the ultraviolet rays enough the percentage of exposure to penetrate up to the bottom of photoresist 10, it is possible to irradiate substrate 30 with the ultraviolet rays enough the percentage of exposure to penetrate up to the bottom of photoresist 10 after irradiating substrate 30 with the ultraviolet rays enough the percentage of exposure to penetrate up to the predetermined level of photoresist 10. That is, it is possible to change the irradiating sequence of substrate 30 as described above without changing any other conditions. If the thick photoresist undergone the UV irradiating steps as described above is developed at once, and then a photoresist mold 50 having a three-dimensional structure as shown in FIG. 9C can be obtained.

In the present invention, the method for forming the photoresist mold having the three-dimensional structure by developing the thick photoresist at a stroke after irradiating the substrate with the ultraviolet rays using two or more photoresist masks exposed to the ultraviolet rays at different percentages of exposure is called as a Multi-step Exposure and Single Development (hereinafter referred to MESD).

In the preferred second embodiment of the present invention, a wafer having a diameter of four inches is coated with a thick photoresist, which is type AZ9262 made available by the Hoechst Company, at a thickness of 46 $\mu$m. Thereafter, the ink channel, the ink cavity and the ink ejecting orifice are formed in the wafer by using the MESD as described above.

In order to accomplish this task, a photoresist solution type AZ9262 is dropped onto a seed metal layer of Ti/Au at several ml. Thereafter, the seed metal layer rotates at a speed of 2,000 rpm for 2.5 seconds, and thereby a uniform thin film having a thickness of 46 $\mu$m is formed. Then, this thin film is maintained within a forced convection oven at a temperature of 85° C. for 40 minutes, and thereafter it is heat-treated within a hot plate at a temperature of 115° C. for 2 minutes. Then, the first photo mask on which the patterns of the ink channel and the ink cavity are formed is aligned with the pattern of the substrate by using a contact aligner, and thereafter the substrate is irradiated with the ultraviolet rays at the percentage of exposure to penetrate up to the bottom of the photoresist under a vacuum contact mode. Thereafter, the substrate is irradiated with the ultraviolet rays by employing the second photo mask on which the pattern corresponding to the ink ejecting orifice is formed. In other words, the second photo mask and the pattern of the photoresist, or the second photo mask and the pattern of the substrate are aligned with each other. Under this state, the substrate is irradiated with the ultraviolet rays enough the percentage of exposure to penetrate up to a predetermined level of the photoresist.

Next, the substrate undergone the UV irradiating steps as described above is developed at a stroke, and thereby a photoresist mold having a three-dimensional structure is formed. Thereafter, this substrate is heat-treated at a temperature range of between 50 and 100° C., preferably about 80° C., for a predetermined time interval, and thereby a shape of the photoresist mold having the three-dimensional structure can change. Consequently, an ink channel, an ink cavity and an ink ejecting orifice which have a desired shape, respectively can be formed.

Figure 10:
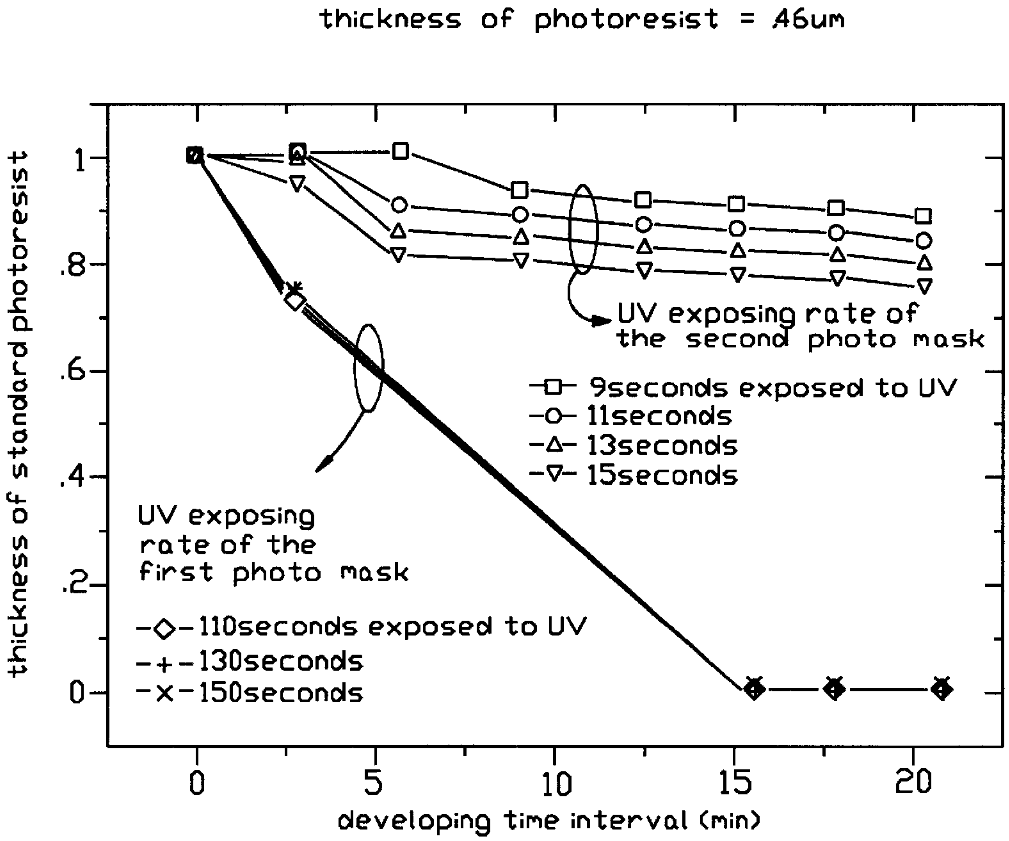
FIG. 10 is a graph showing relations between a variety of exposure rates of the ultraviolet rays and a developing characteristic of the photoresist.
Figure 11A:
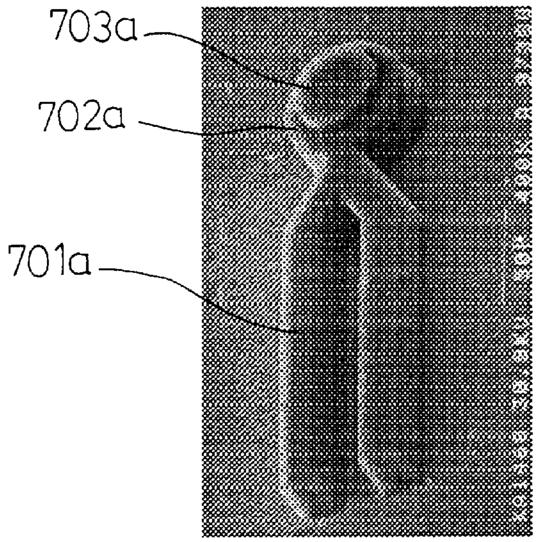
FIGS. 11A to 12B are scanning electron photomicrographs of the photoresist mold produced by using the patterning steps of the photoresist having the three-dimensional structure.
Figure 11B:
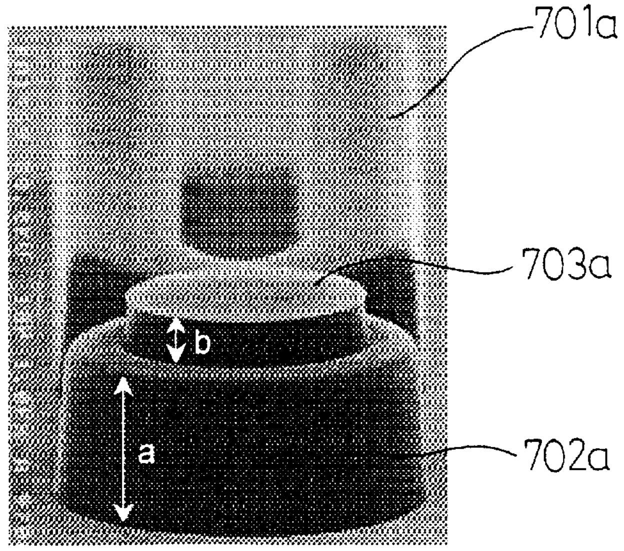

FIG. 10 is a graph showing relations between a variety of exposure rates of the ultraviolet rays and a developing characteristic. That is, FIG. 10 shows relations between the thickness of the photoresist and a developing time interval while the photoresist type AZ9262 having a thickness of 46 μm is irradiated with the ultraviolet rays at different percentages of exposure. As is apparent from FIG. 10, if an irradiation time interval of the ultraviolet rays against the first photo mask is above 110 seconds, it is possible to develop up to the bottom of the photoresist for the developing time interval above 16 minutes. Further, if an irradiation time interval of the ultraviolet rays against the second photo mask changes, the thickness of the photoresist converges to a certain thickness corresponding to the irradiation time interval of the ultraviolet rays. That is, although the photoresist is continuously deposited in a developing solution after developing the irradiated part of the second photo mask up to a predetermined depth, the thickness of the photoresist is slowly reduced. By using this characteristic, it is possible to recognize the irradiation time interval of the ultraviolet rays corresponding to the predetermined depth and to have a room for control the developing time interval.

FIGS. 11A to 12B are scanning electron photomicrographs of the photoresist mold produced by using the MESD as described above. As is apparent from FIG. 11A, there are a first photoresist mold 701*a* corresponding to two second ink channels against one nozzle, a second photoresist mold 702*a* corresponding to the ink cavity, and a third photoresist mold 703*a* corresponding to the ink ejecting orifice. Referring to FIG. 11B which is a partially expanded view of FIG. 11A, a height (a) of first photoresist mold 701*a* and second photoresist mold 702*a* is 36 μm, and a height (b) of third photoresist mold 703*a* corresponding to the ink ejecting orifice is 10 μm.

Figure 12A:
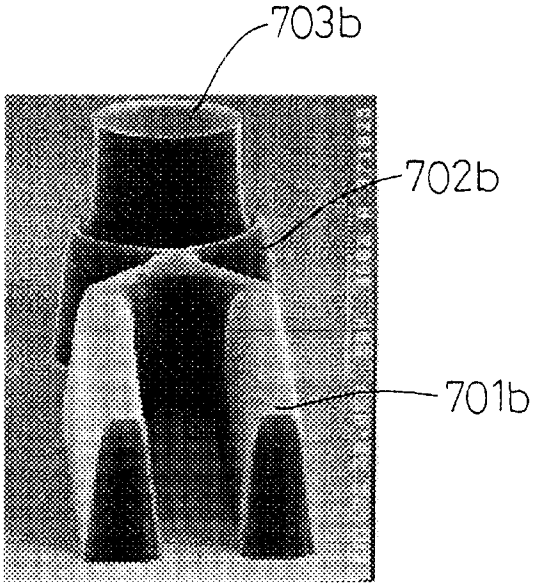
Figure 12B:
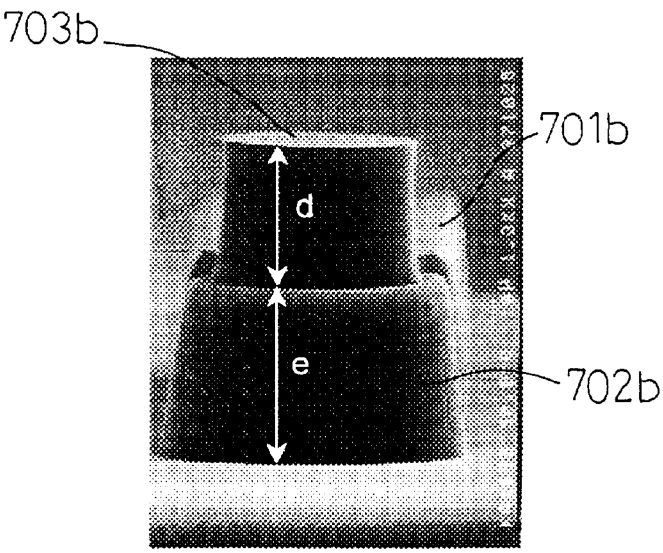

Referring to FIGS. 12A and 12B, it is possible to produce a third photoresist mold 703*b* having a height (d) of 35 μm corresponding to the ink ejecting orifices, a second photoresist mold 702*b* having a height (e) of 43 μm corresponding to the ink cavity, and a first photoresist mold 701*b* corresponding to the ink ejecting orifice from the photoresist having a total thickness of 78 μm by using the MESD.

As understood from FIGS. 12A and 12B, if a height of the photoresist mold corresponding to the ink ejecting orifice becomes large, overflowing of a thick metal plating can be blocked by the photoresist mold and thereby it is possible to increase a sectional height of the ink ejecting orifice. Therefore, according to the preferred second embodiment of the present invention, in the manufacturing process of the ink jet print head, it is possible to form the barrier layer, which is equal to a body consisted of the conventional barrier layer and the conventional nozzle plate combined together, by only once using the patterning process of the photoresist having the three-dimensional structure and the plating process of Ni. At this time, the size and the shape of the plurality of the ink ejecting orifices distributed on the substrate having a wide area can be uniformly formed by the photoresist mold. In addition, the sectional height of the ink ejecting orifice is increased.

Meanwhile, in the forming process of the photoresist mold having the three-dimensional structure according to the MESD as described above, by variously designing the shape of the pattern of the photoresist corresponding to the ink ejecting orifice, it is possible to change the size and the shape of the ink ejecting orifice. Thereby, the ink ejecting orifice having an optimum ink ejecting characteristic can be manufactured.

In a preferred third embodiment of the present invention, the ink jet print head is produced by using the same manufacturing process as that of the second embodiment of the present invention as described. Although the photoresist mold having the three-dimensional structure is manufactured using the MESD as described above, the photoresist mold corresponding to the ink ejecting orifice can be formed as a circular shape, a triangular shape or a quadrangular shape. Following formation of the photoresist mold, the photoresist mold is plated with Ni and thereafter it is etched with organic solvents like acetone. According to the third embodiment of the present invention, it is apparent that the ink ejecting orifice may be optionally designed and produced in order to have the optimum ink ejecting characteristic.

Figure 13:
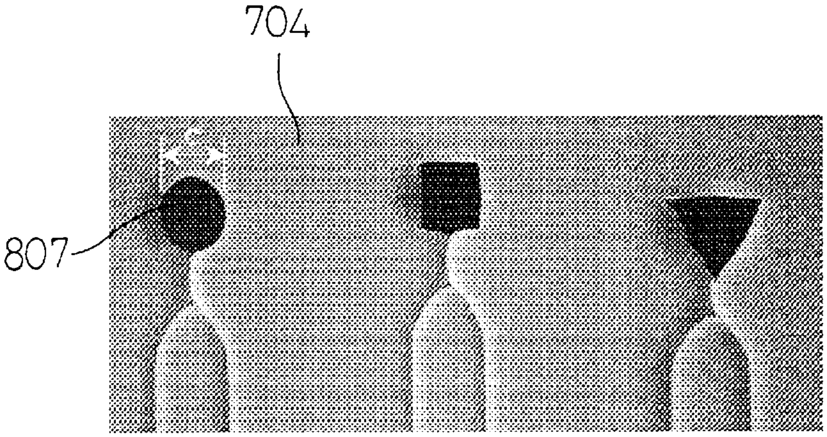
FIG. 13 is a scanning electron photomicrograph looked down on an ink jet print head according to a preferred third embodiment of the present invention.

FIG. 13 is a scanning electron photomicrograph looked down on an ink jet print head according to a preferred third embodiment of the present invention. As is apparatent from FIG. 13, the shapes of the ink ejecting orifice 807 are formed at will. Further, upper surface of the photoresist mold corresponding to the ink channel is completely covered with the overflowing Ni plating layer. Ink ejecting orifice 807 has a circular shape, a triangular shape and a quadrangular shape. A diameter (c) of ink ejecting orifice 807 is 50 μm.

Figure 14:
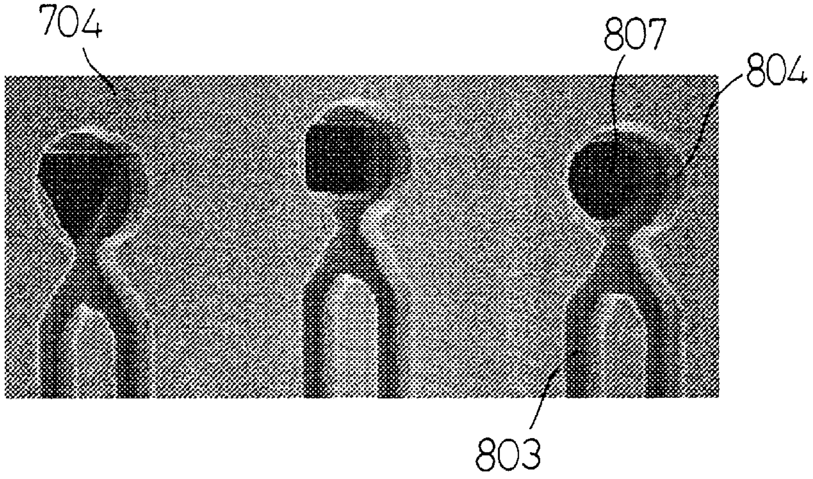
FIG. 14 is a scanning electron photomicrograph looked up the ink jet print head according to the preferred third embodiment of the present invention, under the state that a substrate of the ink jet print head is removed.
Figure 15:
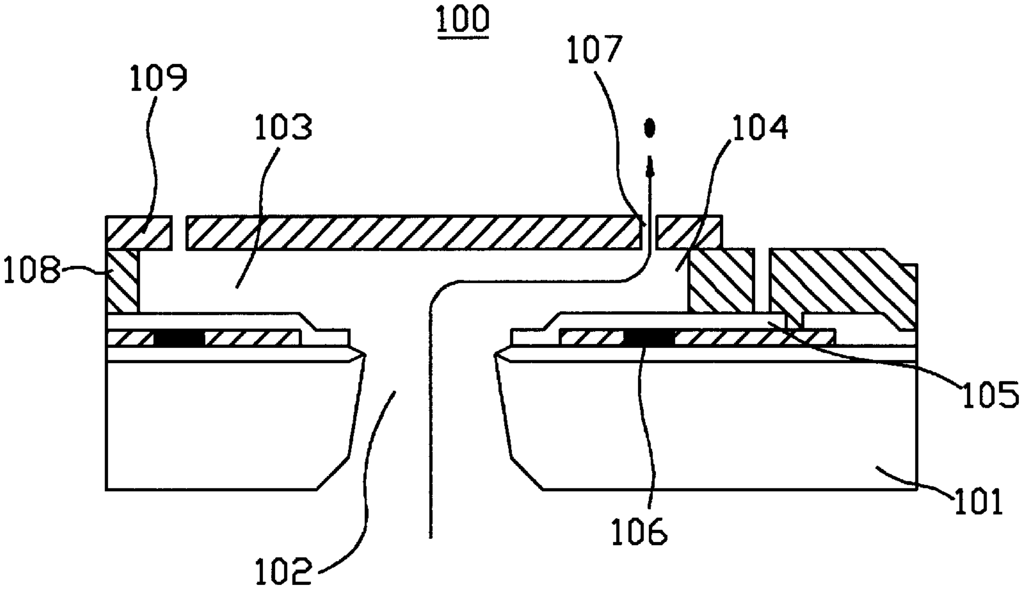
FIG. 15 (PRIOR ART)
FIG. 15 is a sectional view of an ink jet print head according to a prior art, showing an internal structure of the ink jet print head.
Figure 16:
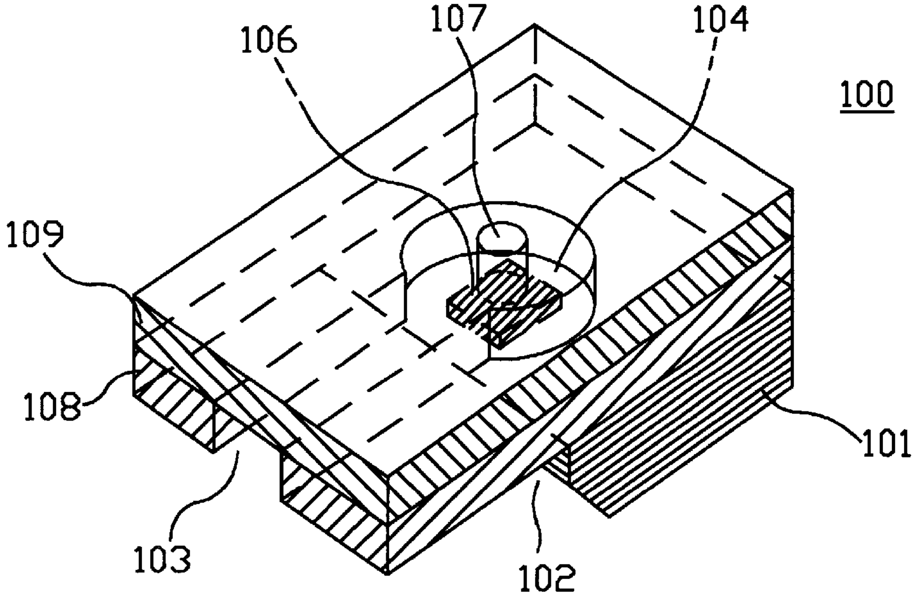
FIG. 16 (PRIOR ART)
FIG. 16 is a perspective view of the ink jet print head shown in FIG. 15, showing positions and shapes of an ink channel, an ink cavity and an ink ejecting orifice.
Figure 17A:
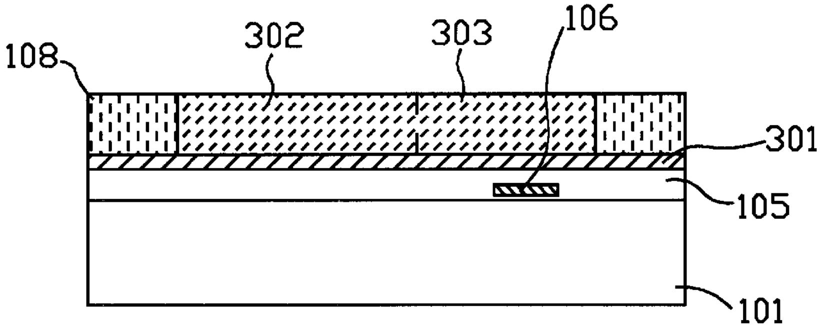
FIG. 17A (PRIOR ART)
FIGS. 17A to 17C are sectional views of assistance in explaining a sequence of manufacturing steps of the ink jet print head according to the prior art.
Figure 17B:
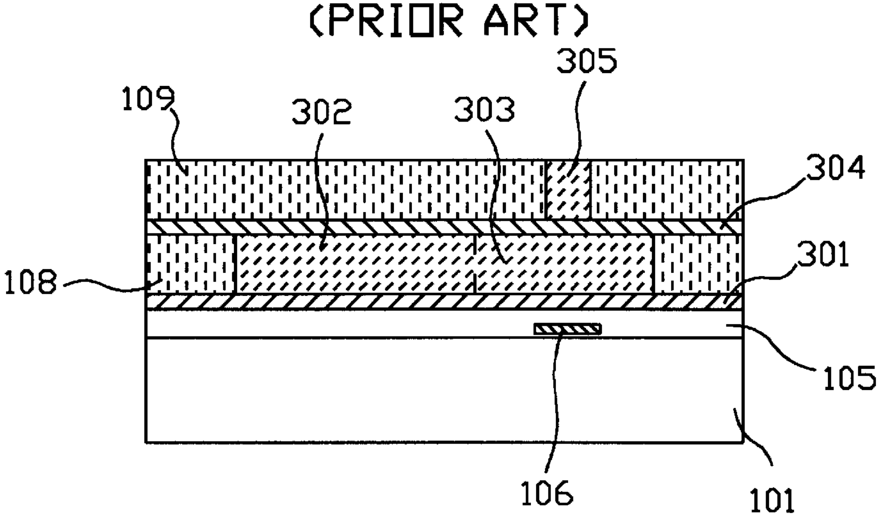
FIG. 17B (PRIOR ART)
Figure 17C:
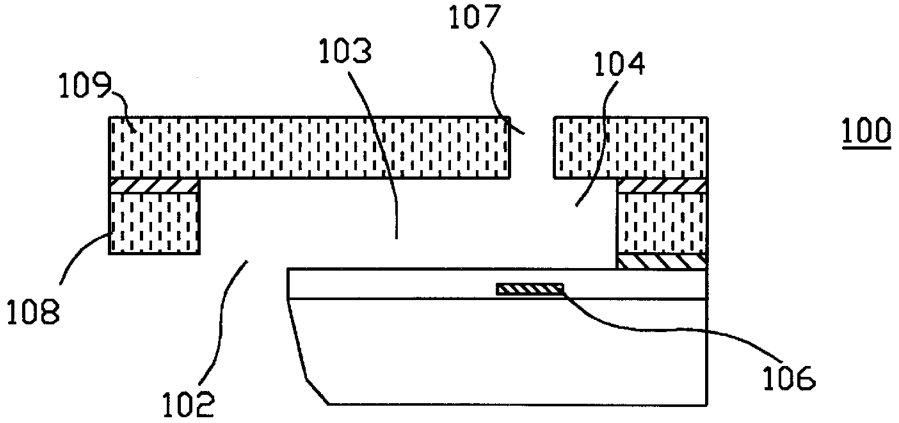
FIG. 17C (PRIOR ART)

FIG. 14 is a scanning electron photomicrograph looked up the ink jet print head according to the preferred third embodiment of the present invention, under the state that a substrate of the ink jet print head is removed. As is apparatent from FIG. 14, a second ink channel 803, an ink cavity 804 and an ink ejecting orifice 807 are completely formed at will. According to the third embodiment of the present invention, it is possible to form second ink channel 803, ink cavity 804 and ink ejecting orifice 807, which have an optimum ink ejecting characteristic, by transforming the shape of the photoresist mold using heat treating process after forming the photoresist mold having the three-dimensional structure using the MESD as described above. Further, in the forming process of the photoresist mold having the three-dimensional structure according to the MESD as described above, by controlling a distance interval of between the photo mask and the photoresist during the first or the second UV irradiating step, it is possible to spread out the ultraviolet rays at will. Consequently, second ink channel 803, ink cavity 804 and ink ejecting orifice 807, which have an optimum ink ejecting characteristic, can be obtained.

As described above, according to the preferred embodiments of the present invention, in the manufacturing process of the ink jet print head, by only once using the patterning process of the photoresist mold or the patterning process of the photoresist mold having the three-dimensional structure and by only once using the plating technique of the metal, the ink channel, the ink cavity and the ink ejecting orifice capable of allowing the ink to flow can be formed. Thereby, the manufacturing cost of the ink jet print head can be reduced and the productivity thereof can be highly enhanced.

When the patterning process of the photoresist mold having the three-dimensional structure is used in order to manufacture the ink jet print head, the metal plating is converged around the photoresist mold protruding as the shape of the ink ejecting orifice. As a result, the plurality of ink ejecting orifices formed on the wide wafer have the uniform size, the desired shape and the high sectional height which are adapted to the optimum ejection of the ink. Accordingly, the quality of the nozzle plate is enhanced and thereby the performance of the ink jet print head is highly enhanced.

The concept of the present invention is not restricted to the manufacture of the monolithic ink jet print head, but instead may be applied to the manufacture of the hybrid ink jet print head. Further, the concept of the present invention is not limited to the thermal ink jet printing, but instead can be applied to the piezoelectric ink jet printing or the like.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A method of producing an ink jet print head, comprising the steps of:

(a) providing a substrate including a wetting layer deposited on an upper surface thereof;

(b) forming a photoresist mold with a three-dimensional structure having a topmost level and at least one intermediate level on said wetting layer;

(c) forming a metal barrier layer over exposed portions of said wetting layer and said photoresist mold except for said topmost level of said photoresist mold; and (d) etching said photoresist mold in order to form an ink flowing passage within said metal barrier layer.

2. A method as in claim 1, further comprising a step of anti-corrosion plating an inner surface of said ink flowing passage in order to prevent said metal barrier layer from being corroded by the ink flowing along said ink flowing passage.

3. A method as in claim 1, wherein said ink flowing passage includes an auxiliary ink channel, an ink cavity and an ink ejecting orifice, which communicate with one another to allow fluid flow thereamong.

4. A method as in claim 3, wherein said photoresist mold includes a first photoresist mold corresponding to said auxiliary ink channel, a second photoresist mold corresponding to said ink cavity, and a third photoresist mold corresponding to said ink ejecting orifice.

5. A method as in claim 4, wherein said third photoresist mold corresponding to said ink ejecting orifice is formed as a three dimensional structure and is formed at a position above said second photoresist mold corresponding to said ink cavity.

6. A method as in claim 4, wherein in the step of (c) forming the metal barrier layer, a preliminary metal barrier layer is deposited on said wetting layer by plating Ni up to the height of said photoresist mold using electrolytic plating or electroless plating, a primary metal barrier layer is formed by continuously plating Ni on said preliminary metal barrier layer, an upper surface of said first photoresist mold is completely covered with an overflowing Ni plating layer, the overflowing Ni plating layer being formed around said third photoresist mold at a position above said second photoresist mold.

7. A method of producing an ink jet print head, comprising the steps of:

(a) providing a substrate including a wetting layer deposited on an upper surface thereof;

(b) forming a photoresist mold with a three-dimensional structure having a topmost level and at least one intermediate level on said wetting layer;

(c) forming a metal barrier layer over exposed portions of said wetting layer and said photoresist mold except for said topmost level of said photoresist mold; and (d) etching said photoresist mold in order to form an ink flowing passage within said metal barrier layer; wherein the step of (b) forming the photoresist mold, comprises the steps of:

(g) coating a photoresist on the substrate prepared in the step of (a) providing the substrate;

(h) heat-treating the substrate on which said photoresist is coated;

(i) firstly irradiating the heat-treated photoresist with ultraviolet rays and enough percentage of exposure to penetrate up to a bottom of said photoresist by using a first photo mask on which patterns corresponding to an ink channel and an ink cavity are formed;

(j) secondly irradiating the firstly irradiated photoresist with ultraviolet rays and enough percentage of exposure to penetrate up to a predetermined level of said photoresist by using a second photo mask on which a pattern corresponding to an ink ejecting orifice is formed; and (k) forming a photoresist mold having a three-dimensional structure by developing the secondly irradiated photoresist.

8. A method of producing an ink jet print head, comprising the steps of:

(a) providing a substrate including a wetting layer deposited on an upper surface thereof;

(b) forming a photoresist mold with a three-dimensional structure having a topmost level and at least one intermediate level on said wetting layer;

(c) forming a metal barrier layer over exposed portions of said wetting layer and said photoresist mold except for said topmost level of said photoresist mold; and (d) etching said photoresist mold in order to form an ink flowing passage within said metal barrier layer; wherein the step of (b) forming the photoresist mold, comprises the steps of:

(g) coating a photoresist on the substrate prepared in the step of (a) providing the substrate;

(h) heat-treating the substrate on which said photoresist is coated;

(i) firstly irradiating the heat-treated photoresist with ultraviolet rays and enough percentage of exposure to penetrate up to a predetermined level of said photoresist by using a first photo mask on which a pattern corresponding to an ink ejecting orifice is formed;

(j) secondly irradiating the firstly irradiated photoresist with ultraviolet rays and enough percentage of exposure to penetrate up to a bottom of said photoresist by using a second photo mask on which patterns corresponding to an ink channel and ink cavity are formed; and (k) forming a photoresist mold having a three-dimensional structure by developing the secondly irradiated photoresist.

* * * * *